MAGNETIC SOUND RECORD ERASING METHOD AND HEADS THEREFOR
Filed Aug. 30, 1950

INVENTOR.
MICHAEL RETTINGER
BY [signature]
ATTORNEY

United States Patent Office
2,730,570
Patented Jan. 10, 1956

2,730,570

MAGNETIC SOUND RECORD ERASING METHOD AND HEADS THEREFOR

Michael Rettinger, Encino, Calif., assignor to Radio Corporation of America, a corporation of Delaware Application August 30, 1950, Serial No. 182,316

6 Claims. (Cl. 179—100.2)

This invention relates to magnetic sound recording methods and systems, and particularly to a method of and system for erasing sound records from magnetic record mediums.

With the advent of magnetic sound recording and reproduction, several methods and systems for erasing the sound record on a magnetic medium have been developed. The erasing may be accomplished by placing the entire record medium in an alternating field, or the record may be linearly subjected to an alternating field prior to the recording of a new record. Several types and forms of magnetic heads for applying the field to the magnetic record have been suggested, one of which is disclosed and claimed in Howell U. S. Patent No. 2,498,423 of February 21, 1950. The present invention is directed to several forms of magnetic head construction and to a method which permits more complete erasing of the record than has been heretofore obtained by former systems and methods.

The general principle of continuous alternating current erasing consists in passing the recorded medium through an alternating magnetic field, which, in its central portion, has a high enough flux density to saturate the medium, and which, outside the central region, decays to zero. The necessary extent of the field, both in its center and in its adjoining regions, is dependent upon the wavelength of the erasing current, in order to assure a sufficient number of magnetic reversals while the medium is passing over the erasing head gap. This wavelength, in turn, is dependent upon the speed with which the medium travels, and is given by $\lambda=V/F$, where $\lambda$ is equal to the wavelength in inches, F is equal to the frequency in cycles per second, and V is equal to the speed of the medium in inches per second. Thus, for a 68,000 cycle frequency and a medium speed of eighteen inches per second, the wavelength comes to $\frac{18}{68,000}$ or .000265 inch. In the case of a .004 inch long central field, every portion of the medium in its passage over the eraser is subjected to approximately fifteen magnetic reversals.

Ring-shaped magnetic heads constitute, at present, the preferred type of erasers. Like ring-shaped recording and reproducing heads, they consist usually of two laminated cores forming a sort of toroid with a back and front gap. The material for the laminations is most frequently silicon steel because of its higher saturation point, compared to mumetal or permalloy. The lamination thickness is kept very small, .003 inch or less, to reduce eddy current losses and the consequent heating effects to a minimum. While the front gap may assume various configurations, the back gap generally consists of a butt joint. Since the front gap reluctance is large, no demagnetizing back-gap spacer is required, such as used in a recording head.

For a given front gap length of head, two factors appear to favor a high erase frequency. The first consists in the increased number of magnetic reversals to which the tape is subject as it passes over the head. The second lies in the greater amount of self-demagnetization on the part of the small "dipoles" on the magnetic medium.

The principal object of the invention, therefore, is to facilitate the erasing of a magnetic record on a magnetic medium.

Another object of the invention is to provide an improved method of and system for erasing magnetic records.

A further object of the invention is to provide an improved construction of magnetic erasing heads.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Figure 1:
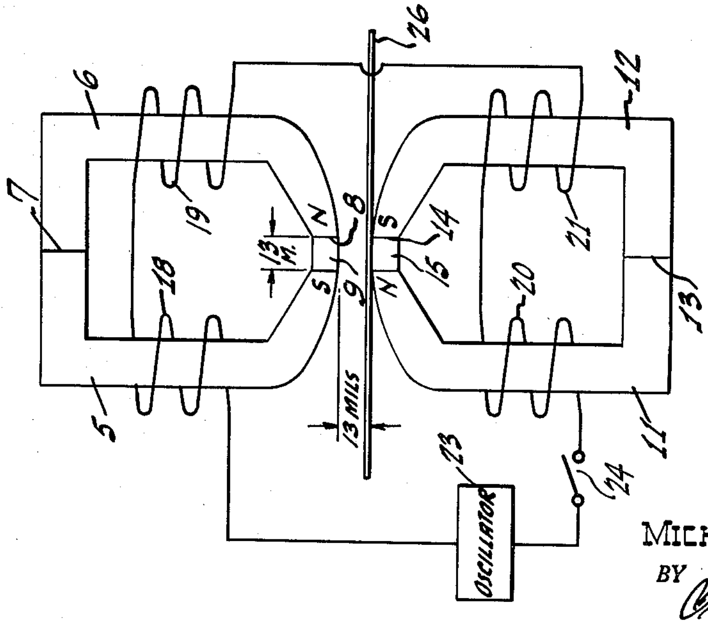
Fig. 1 shows one form of construction of an erasing head.

Referring now to Fig. 1, two laminated cores 5 and 6 have a rear butt joint 7 and a front gap 8, in which is a plastic or similar type of spacer 9. An identical head is provided having core sections 11 and 12 with a rear butt joint 13 and a front gap 14, provided with a plastic spacer 15. Around the cores 5, 6, 11, and 12, are respective windings 18, 19, 20, and 21 connected in series to an erase energy source, such as an oscillator 23, which is connected to the windings when a switch 24 is closed. These heads may have a construction similar to that shown in my co-pending U. S. application, Ser. No. 151,567, filed March 24, 1950.

A magnetic medium, such as a film or tape 26, is shown passing between the gaps 8 and 14. In the arrangement shown in Fig. 1, the two opposing heads have front gap widths of the order of thirteen mils or more, and the gaps are spaced from each other by the same distance. The respective windings are wound on the cores such as to provide opposite polarizations directly opposite one another, so that the tape 26 is subjected to direct flux between the north and south poles of the respective heads, and also, to leakage flux. This arrangement of heads thereby provides more efficient erasing of the magnetic record on the magnetic medium 26 than would otherwise be produced by a single head.

Figure 2:
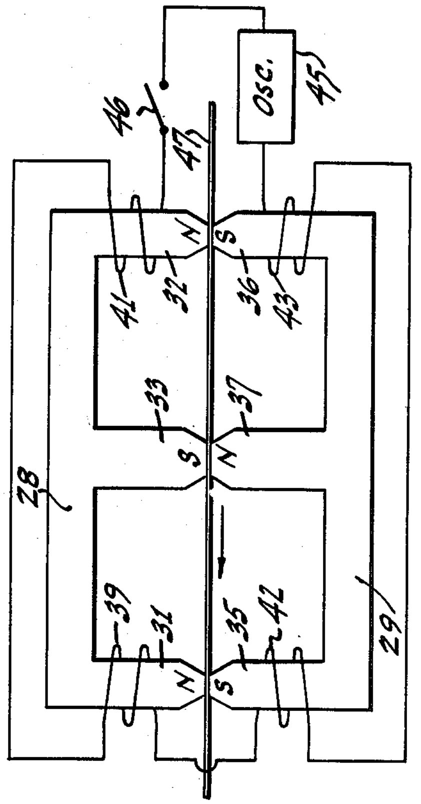
Fig. 2 shows another form of construction of an erasing head.

Referring now to Fig. 2, a triple pole head is shown, wherein each core 28 and 29 is of the E-shaped type. The core 28 has end sections 31 and 32 and a central section 33, while the core section 29 has end sections 35 and 36 and a central section 37. Windings 39 and 41 are connected in series around end sections 31 and 32 and in series with windings 42 and 43 around end sections 35 and 36, the windings being connected to an erase oscillator 45 when a switch 46 is closed. In this embodiment of the invention, the film or tape 47 passes in serial order between the end sections 32 and 36, then between central sections 33 and 37, and then between end sections 31 and 35 when the tape is passed in the direction of the arrow. In this embodiment, the magnetic record is subjected to three applications of the erasing current by direct flux between the opposing pole pieces of opposite polarities.

Figure 3:
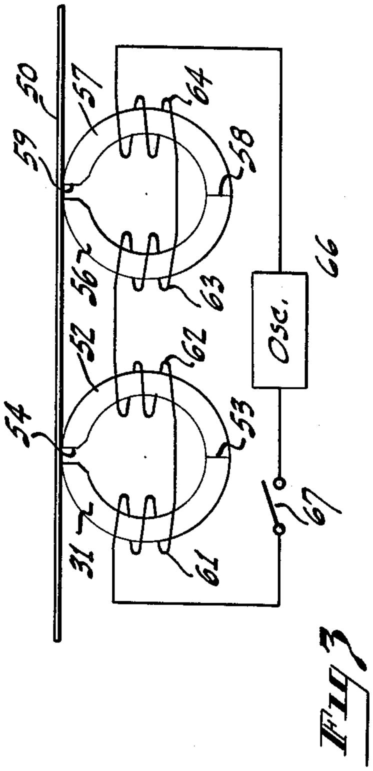
Fig. 3 shows an arrangement of erasing heads in accordance with the method of the invention.

Referring now to Fig. 3, two magnetic heads of the general type shown in Fig. 1 are connected in a spaced relationship along a magnetic tape 50. These heads may be also constructed as disclosed in my above mentioned co-pending application. One head has core sections 51 and 52 with a rear butt joint 53 and a front gap 54 which may have a plastic spacer therein similar to gaps 8 and 14 in Fig. 1. The other head has core sections 56 and 57 with a rear butt joint 58 and a front gap 59. Windings 61,

62, 63, and 64 on the cores of the two heads are connected in series and to an oscillator 66 when a switch 67 is closed.

It has been found that this type of cascade connection of two heads provides more complete erasing action than other forms of heads, because of the "re-awakening" or "memory" characteristic of a magnetic record. For instance, the recorded signal may be subjected to a tremendous erasing action, which signal appears completely eliminated after the erasing current has been applied, but which, when measured some time subsequently, has been found to have returned to some extent. There appears that a re-orientation of the dipoles constituting the signal occurs after the first application of the erasing current. However, a second application, after the dipoles have re-oriented themselves, completely obliterates the signal. It has been found that the separation between the gaps 54 and 59 of the two heads should be in the neighborhood corresponding to a time interval of one-tenth of a second.

By the use of two heads in cascade, a much lower value of erase current is required, which reduces heating of the heads. This permits the use of laminations of standard thickness. By use of this method, the heads may be made small so that they may be aligned transversely of the medium for erasing multiple tracks on a single medium. The heads used were found to be particularly effective when the front gaps were approximately four mils in width and a current of seventy milliamperes was applied to the windings. This applied a seventy decibel erasure to a film or tape type of magnetic record medium. The inductance of the windings of each head was approximately two millihenries, and the frequency of the erasing current was in the neighborhood of seventy kilocycles.

I claim:

1. The method of applying erasing energy to a magnetic record comprising generating two independent and distinct magnetic fields of superaudible erasing energy at a distance from one another so that there is substantially no overlapping thereof, and applying said fields to a moving magnetic medium having varying amounts of magnetism therein, the distance between said fields and the speed of said medium being such that the difference in time of application of said erasing energy to said medium is at least one-tenth of a second and each magnetic field is substantially zero at the midpoint between said fields, the frequency of said superaudible erasing energy and the speed of said medium to which said energy is being applied being such that at least fifteen magnetic reversals are produced in every section of said medium at each point of maximum application of said fields and over 2000 reversals being produced of diminishing amplitude from maximum to substantially zero amplitude between the application of said first field and the application of said second field.

2. The method of erasing a magnetic record comprising generating two separate and distinct sources of flux variations at a superaudible frequency and subjecting said record to said flux sources in consecutive order, the time difference between the subjecting of the same portions of said record to the maximum amplitude of said flux sources, the frequency of said flux sources, and the speed of said record to which said sources are being applied being such that at least fifteen flux reversals are produced in every section of said medium at each point of maximum application of said flux, and over 2000 flux reversals of diminishing amplitude from maximum to substantially zero amplitude are produced in every section of said medium between the application of said first flux source and the application of said second flux source.

3. The method of erasing a moving magnetic record, comprising applying an erasing field of superaudible frequency to said record in two consecutive applications separated by a time difference of approximately one-tenth of a second and a zero magnetic field, each application of said erasing current producing at least fifteen magnetic reversals of maximum amplitude to every section of said record and approximately 4000 magnetic reversals from maximum to substantially zero between said applications.

4. An erasing head system for moving magnetic records comprising a plurality of cooperating pairs of core sections, each cooperating pair of core sections forming a separate and distinct erase head with at least one gap therein and an air space between said gaps at which a substantially zero field exists at the mid position between said gaps, windings on said core sections, and a source of superaudible erasing current connected to said windings, the speed of said records and the width of said gaps being such that at least fifteen magnetic reversals are obtained in every section of said records at each gap and over 2000 magnetic reversals of diminishing amplitude from maximum to substantially zero between said gaps.

5. An erasing head structure in accordance with claim 4, in which the windings of said separate heads are connected in series.

6. An erasing head structure in accordance with claim 5, in which said heads are spaced from one another along the records to be erased.

References Cited in the file of this patent

UNITED STATES PATENTS

| | | |
|---|---|---|
| 2,498,423 | Howell | Feb. 21, 1950 |
| 2,550,753 | Andrews | May 1, 1951 |